(12) United States Patent
Charlier et al.

(10) Patent No.: US 6,300,623 B1
(45) Date of Patent: Oct. 9, 2001

(54) IR SENSOR WITH REFLECTIVE CALIBRATION

(75) Inventors: Olivier Charlier, Brussels (BE); William R. Betts, Chasetown (GB); Roger Diels, Erps-Kwerps (BE)

(73) Assignee: Melexis NV (BE)

( * ) Notice: Subject to any disclaimer, the term of this patent is extended or adjusted under 35 U.S.C. 154(b) by 0 days.

(21) Appl. No.: 09/287,464

(22) Filed: Apr. 7, 1999

Related U.S. Application Data

(63) Continuation-in-part of application No. 09/262,896, filed on Mar. 10, 1999.

(51) Int. Cl.$^7$ ....................................................... G01J 5/04
(52) U.S. Cl. ............................................................ 250/252.1
(58) Field of Search ............................................ 250/252.1

(56) References Cited

U.S. PATENT DOCUMENTS

| | | |
|---|---|---|
| 4,365,896 | 12/1982 | Mihalow . |
| 4,435,093 | 3/1984 | Krause . |
| 4,560,874 | 12/1985 | Cinzori et al. . |
| 5,200,624 | 4/1993 | Pederson, Jr. et al. . |
| 5,531,377 | 7/1996 | Thayer et al. . |
| 6,122,042 * | 9/2000 | Wunderman et al. ................. 356/73 |

FOREIGN PATENT DOCUMENTS

| | | |
|---|---|---|
| 147 872 | 4/1981 | (DE) . |
| 3518262 A1 | 11/1986 | (DE) . |
| WO 99/01726 | 5/1998 | (WO) . |

\* cited by examiner

*Primary Examiner*—Constantine Hannaher
*Assistant Examiner*—Otilia Gabor
(74) *Attorney, Agent, or Firm*—Townsend and Townsend and Crew, LLP

(57) ABSTRACT

A self-calibrating infrared (IR) sensing device having the capability to measure the attenuation effects of surface contamination on the transmission window and to adjust the gain of the sensor accordingly so as to counter the attenuation. The IR sensing device includes an IR sensor mounted in a housing having an IR transparent window that allows IR radiation originating from outside the housing to be directed toward the sensor. The IR sensor includes a thermally isolated area of IR-absorbing material coupled to a temperature measuring unit. IR radiation impinging on the sensor is absorbed, thereby raising the temperature of the IR absorbing material. The temperature measuring unit measures the increase in temperature and generates a proportional electronic signal indicative of the temperature. The electronic signal is received and processed by a processor. An IR radiator is also included within the sensing device housing. When activated, the radiator emits IR radiation that passes through the window and is reflected by an external mirror onto the IR sensitive element. If the surface of the window is contaminated, a portion of the reflected signal is absorbed and the attenuated signal is detected by the sensor. The relative magnitude of the attenuated signal indicates the amount of contaminant on the surface of the window. The attenuated signal is detected and measured by the IR sensor, and is used to signal a warning and/or determine the amount of gain necessary to compensate for the loss of true signal caused by the presence of the contamination.

31 Claims, 6 Drawing Sheets

IR SENSOR WITH REFLECTIVE CALIBRATION

CROSS-REFERENCES TO RELATED APPLICATIONS

This application is a continuation-in-part of U.S. patent application Ser. No. 09/262,896, filed Mar. 10, 1999, entitled "IR SENSOR WITH REFLECTIVE CALIBRATION," the disclosure of which is hereby incorporated by reference in its entirety.

BACKGROUND OF THE INVENTION

The present invention relates in general to infrared (IR) sensing devices, and more particularly to a self-calibrating IR sensing device.

IR sensors are used to measure temperatures of remote objects by detecting the infrared radiation emitted from the target object. In a typical configuration, IR radiation enters the housing in which the sensor element is located through an IR transparent window and impinges upon the sensor. The temperature is typically measured by detecting the IR radiation and determining its effect on a thermally isolated radiation absorbing area of the sensor. In many typical applications the radiation from the remote object is gathered and focussed onto the sensing element by an external mirror arrangement for increased effectiveness. When the surface of the window or the mirror arrangement becomes contaminated by particles or residues that absorb IR radiation, incoming IR radiation is absorbed such that the amount of IR radiation passing through the window becomes attenuated. The IR transmission capability of the window and the IR reflectance capability of the mirror arrangement is therefore degraded by the presence of IR-absorbing contaminants. Such degradation results in erroneous temperature readings by the sensor. Accordingly, what is needed in the art is the ability to easily counter the attenuation effects of IR-absorbing contaminants deposited on the transmission window and mirror arrangement so as to accurately detect and measure the IR radiation received from a target object.

SUMMARY OF THE INVENTION

The present invention provides a self-calibrating infrared (IR) sensing device having the capability to measure the attenuation effects of surface contamination on the transmission window and mirror arrangement. The sensing device of the present invention also includes the capability to adjust the gain of the sensor to counter the attenuation caused by any IR-absorbing contaminants on the transmission window and mirror arrangement.

According to the invention, an IR sensing device includes an IR sensor mounted in a housing having an IR transparent window that allows IR radiation originating from outside the housing, for example from a target source, to be directed toward the sensor. The radiation detected by the sensor is made up of a combination of the external IR radiation entering the housing through the IR transparent window and the inherent background radiation from the inner surface of the housing. The IR sensor includes a thermally isolated area of material selected for its ability to absorb IR radiation at a specific frequency or at a range of radiation frequencies. The incoming radiation is absorbed, thereby raising the temperature of the IR absorbing material. A temperature measuring unit coupled to the absorbing material measures the increase in temperature and generates a proportional electronic signal indicative of the temperature. The electronic signal is received and processed by a processor.

An IR radiator is also included within the sensing device housing. The IR radiator is preferably shielded from the IR absorbing material by an internal screen. When activated, the radiator emits IR radiation that passes through the window and is reflected back into the sensing device housing by an external mirror arrangement. If the surface of the window is contaminated, the reflected radiation will be attenuated (e.g., the magnitude will be reduced). In the case where the IR radiator is pulsed, for example, the magnitude of the reflected signal indicates the clarity of the signal path, or inversely, the amount of contaminant on the surface of the window. The attenuated reflected signal is detected and measured by the IR sensor, and is used to signal a warning and/or determine the amount of gain necessary to compensate for the loss of true signal caused by the presence of the contamination. IR radiation that falls on the inside of the housing is preferably shielded from the sensor by the internal shield.

According to an aspect of the invention, an IR sensing device is provided. The IR sensing device includes an IR sensor for detecting IR radiation, wherein the IR sensor generates electrical signals in response to and indicative of any IR radiation detected by the IR sensor. The sensing device also typically includes an IR opaque enclosure surrounding the IR sensor, the enclosure having an IR transparent window positioned to allow IR radiation from outside the enclosure to fall on the IR sensor, and an IR radiator positioned within the enclosure, wherein the IR radiator emits IR radiation. A mirror element, external to the enclosure, is included for reflecting IR radiation. In operation, at least a portion of a first IR radiation signal emitted by the IR radiator is reflected by the mirror element onto the IR sensor, wherein the reflected IR radiation signal is detected by the IR sensor, and wherein the IR sensor generates a first electric signal proportional to the detected IR radiation signal. The sensing device also typically includes a processor coupled to the IR sensor for analyzing the electrical signals generated by the IR sensor, wherein the processor receives and analyzes the first electric signals to determine characteristics of the reflected signal.

According to another aspect of the invention a method is provided for measuring the temperature of a remote target object with an IR sensing device, wherein the IR sensing device includes an IR sensor mounted in a housing, the housing having a window through which IR radiation from a remote target object enters the device and impinges on the IR sensor. The method typically includes the step of generating a first IR radiation signal with an IR radiator located within the housing. An external mirror arrangement reflects the generated first IR signal back to the IR sensing device, such that if there is any IR-absorbing contamination on the window, the contamination absorbs at least a portion of the reflected IR radiation signal. The method also typically includes the steps of detecting the reflected IR radiation signal with the IR sensor, and generating a first electric signal proportional to the detected signal. The method further typically includes the steps of analyzing the first electric signal with a processor to determine the magnitude of the detected signal, wherein the magnitude of the detected signal is indicative of the amount of IR absorbing contamination on the window. Thereafter a remote IR radiation signal generated by the remote object is detected, wherein the remote IR radiation signal is indicative of the temperature of the remote object, wherein the remote signal is attenuated by a first amount by the IR absorbing contamination before being detected by the IR sensor. The method also typically includes the step of compensating for the first amount of attenuation in the detected remote IR radiation signal so as to accurately determine the temperature of the remote object.

According to yet another aspect of the invention, an Infra Red (IR) sensing device is provided which typically comprises an IR sensing means for detecting IR radiation, wherein the IR sensing means generates an electrical signal responsive to and indicative of the level of IR radiation falling on it; electronic interface means for processing the electrical signal, wherein the interface means generates a signal representative of the IR radiation detected by the sensing means; and an IR opaque enclosure surrounding the IR sensing means and the electronic interface means, the enclosure including an IR transparent window arranged to allow IR radiation from a remote target object to fall on the IR sensing means. The device also typically comprises an IR radiating means for emitting IR radiation within the enclosure; a first control means for controlling the IR radiation means to radiate IR energy; a mirror element, located external the housing, for reflecting IR radiation emitted by the IR radiating means onto the IR sensing means through the window, wherein the reflected IR radiation is attenuated by IR-absorbing contaminants on the window; a signal processing means for determining an amount of contamination on the IR transparent window by analyzing a first electrical signal generated by the IR sensing means in response to the reflected signal detected thereby; and a second control means for controlling the electronic interface means to compensate for the amount of contamination.

According to a further aspect of the invention, an Infra Red (IR) sensing device arrangement is provided. The arrangement typically comprises a first IR sensing device and a second IR sensing device located proximal the first IR sensing device. The first IR sensing device typically includes a first IR sensor for detecting IR radiation, wherein the first IR sensor generates first electrical signals in response to and indicative of any IR radiation detected by the first IR sensor; a first IR opaque enclosure surrounding the first IR sensor, the first enclosure having a first IR transparent window positioned to allow IR radiation from outside the first enclosure to fall on the first IR sensor; a first mirror element, external to the first enclosure, for reflecting IR radiation; and a first IR radiator located within the first enclosure, wherein the first IR radiator emits IR radiation. The second sensing device typically includes a second IR sensor for detecting IR radiation, wherein the second IR sensor generates second electrical signals in response to and indicative of any IR radiation detected by the second IR sensor; a second IR opaque enclosure surrounding the second IR sensor, the second enclosure having a second IR transparent window positioned to allow IR radiation from outside the second enclosure to fall on the second IR sensor; a second mirror element, external to the second enclosure, for reflecting IR radiation; and a second IR radiator located within the second enclosure, wherein the second IR radiator emits IR radiation. The arrangement also typically includes a processor coupled to the first and second IR sensors for analyzing electric signals generated by the first and second IR sensors. In operation, at least a first portion of a first IR radiation signal emitted by the first IR radiator is reflected by the first mirror element onto the first IR sensor, at least a second portion of the first IR radiation signal emitted by the first IR radiator is reflected by the second mirror element onto the second IR sensor, at least a first portion of a second IR radiation signal emitted by the second IR radiator is reflected by the second mirror element onto the second IR sensor, and at least a second portion of the second IR radiation signal emitted by the second IR radiator is reflected by the first mirror element onto the first IR sensor. The first IR sensor generates a first electric signal proportional to the IR radiation signal detected thereby, and the second IR sensor generates a second electric signal proportional to the IR radiation signal detected thereby, wherein the processor receives and analyzes the first and second electric signals to determine characteristics of the detected IR radiation signals.

According to yet a further aspect of the present invention, an Infra Red (IR) sensing device arrangement is provided. The arrangement typically comprises a first IR sensing device and a second IR sensing device located proximal the first IR sensing device. Each IR sensing device typically includes an IR sensor for detecting IR radiation, wherein each IR sensor generates electrical signals in response to and indicative of any IR radiation detected by the IR sensor; an IR opaque enclosure surrounding the IR sensor, each enclosure having an IR transparent window positioned to allow IR radiation from outside the enclosure to fall on the IR sensor; and an IR radiator located within the enclosure, wherein each IR radiator emits IR radiation. The arrangement also typically includes a mirror element, external to the first and second enclosures, for reflecting IR radiation; and a processor coupled to the first and second IR sensors for analyzing electric signals generated by the first and second IR sensors. In operation, at least a first portion of a first IR radiation signal emitted by the first IR radiator is reflected by the mirror element onto the first IR sensor through the first window, at least a second portion of the first IR radiation signal emitted by the first IR radiator is reflected by the mirror element onto the second IR sensor through the second window, at least a first portion of a second IR radiation signal emitted by the second IR radiator is reflected by the mirror element onto the second IR sensor through the second window, and at least a second portion of the second IR radiation signal emitted by the second IR radiator is reflected by the mirror element onto the first IR sensor through the first window. The first IR sensor generates a first electric signal proportional to the IR radiation detected thereby, and the second IR sensor generates a second electric signal proportional to the IR radiation detected thereby, wherein the processor analyzes the first and second electric signals to determine characteristics of the IR radiation detected by the first and second sensors.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
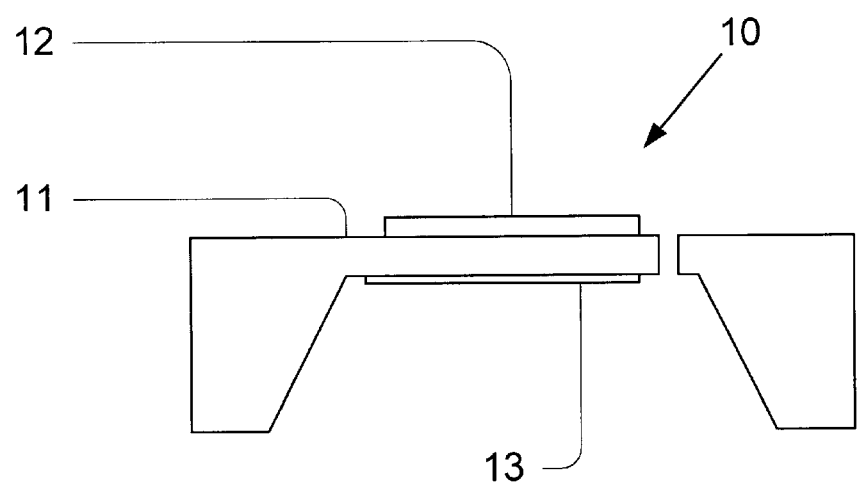
FIG. 1 is a sectional schematic diagram of a typical IR sensor arrangement according to the present invention.

FIG. 1 is a sectional schematic diagram of an IR sensor arrangement 10 according to the present invention. IR sensor 10 includes an area of IR absorbing material 12 mounted on a substrate 11 with a temperature measuring unit 13 positioned as is well known to effectively measure the temperature of IR absorbing material 12. Absorbing material 12 includes material selected for its ability to absorb IR radiation at a specific frequency or at a range of radiation frequencies as required for specific applications. In preferred aspects, temperature measuring unit 13 is any temperature measuring device capable of generating an electrical signal responsive to and indicative of the temperature of the IR absorbing material. In more preferred aspects, temperature measuring unit 13 includes a plurality of thermopiles that generate a voltage on the order of approximately 100 microvolts per degree Celsius temperature rise. Examples of such thermopiles include Polysilicon—Aluminum junctions and Aluminum—Diffusion junctions. One hundred such thermopiles connected in series generate approximately ten milli-volts for a one degree Celsius temperature rise. This signal is amplified using well known circuitry arranged to compensate for such inherent errors as offsets, gain variations, unwanted temperature dependencies and drift. The parameters associated with the correction of these inherent errors are stored in a non-volatile memory to permit calibration of the sensing arrangement after manufacture and installation in a housing as will be described in more detail below. Calibration of the sensor is accomplished, for example, by using a heating element embedded in insulated absorbing area 12. Passing a current through the heating element causes the temperature of the absorbing material 12 to rise by a controlled amount. This effect is measured and the results are used to calibrate the sensor.

Substrate 11 is preferably as thin as possible so that temperature measurement unit 13 is as close as possible to IR absorbing material 12. In addition, substrate 11 is preferably arranged such that the thin section of substrate 11 between absorbing material 12 and temperature measuring unit 13 is thermally isolated from the bulk of the arrangement. This helps ensure that heat loss from (the thin area of) substrate 11 does not degrade the accuracy of the signal generated by temperature measurement unit 13.

Figure 2:
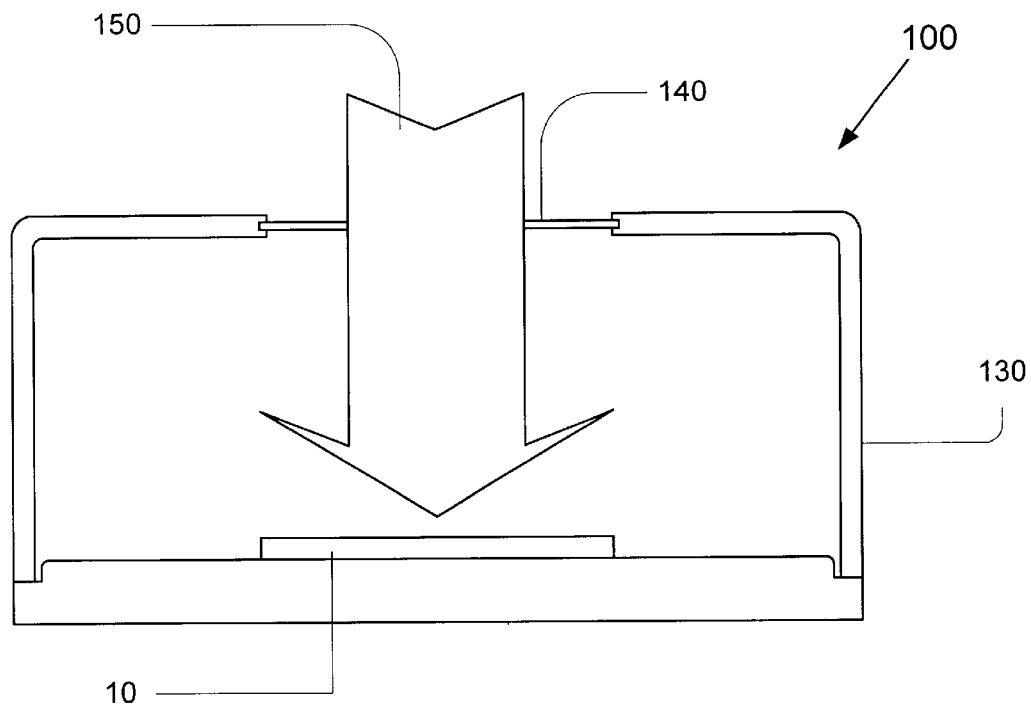
FIG. 2 is a sectional schematic diagram of an assembled IR sensing device including the IR sensor of FIG. 1, according to an embodiment of the present invention.

FIG. 2 is a sectional schematic diagram of an assembled IR sensing device 100 including IR sensor 10, according to an embodiment of the present invention. IR sensor 10 is mounted in a housing 130 having a window 140 through which IR radiation 150 can pass substantially unhindered. The IR radiation falling on IR sensor 10 is absorbed by IR absorbing material 12, which causes an increase in the temperature of absorbing material 12 and a corresponding signal change from temperature measurement unit 13.

Figure 3:
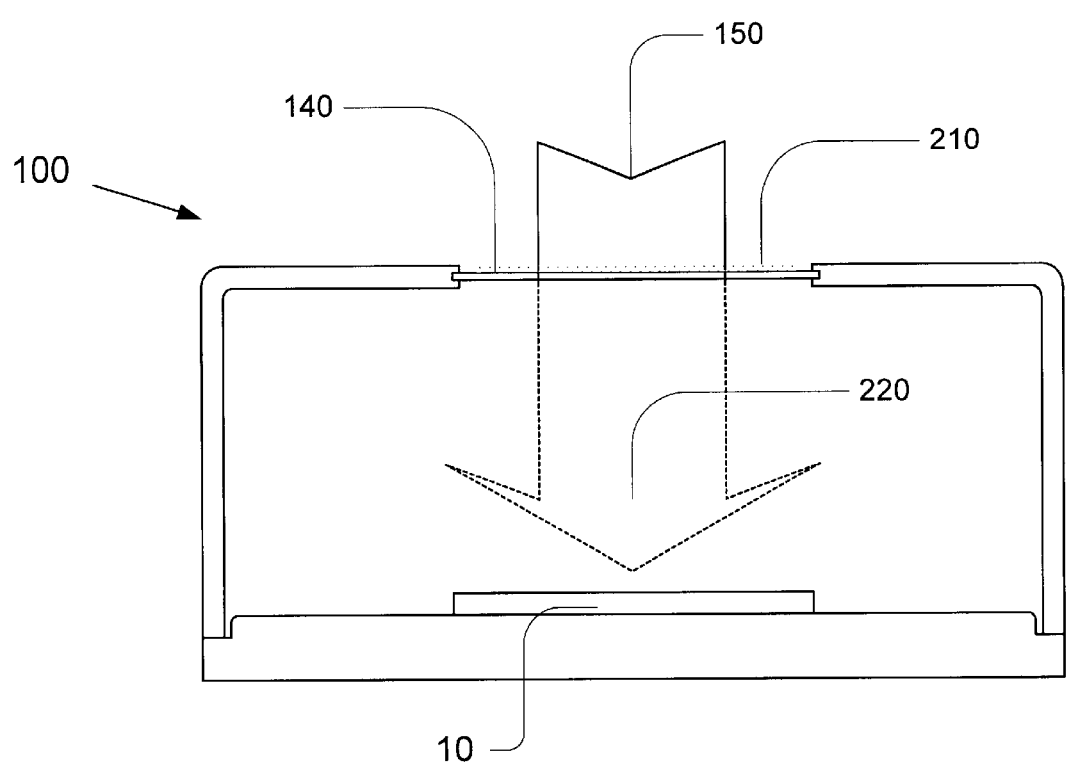
FIG. 3 is a schematic diagram showing effects of contamination on the IR transmission of the transmission window.

FIG. 3 is a schematic diagram showing effects of contaminants 210 on the IR transmission properties of transmission window 140. When present on window 140, contaminants 210 typically absorb a portion of incoming IR radiation 150 so that less IR radiation is passed through to sensor 10. The dotted lines of attenuated IR radiation 220 indicate that the amount of IR radiation passed through window 140 is less than the amount of incoming IR radiation 150. In general, the greater the amount of contaminants 210 deposited on window 140, the greater the absorption of incoming IR radiation 150, and therefore, the greater the attenuation resulting in IR radiation 220.

Figure 4:
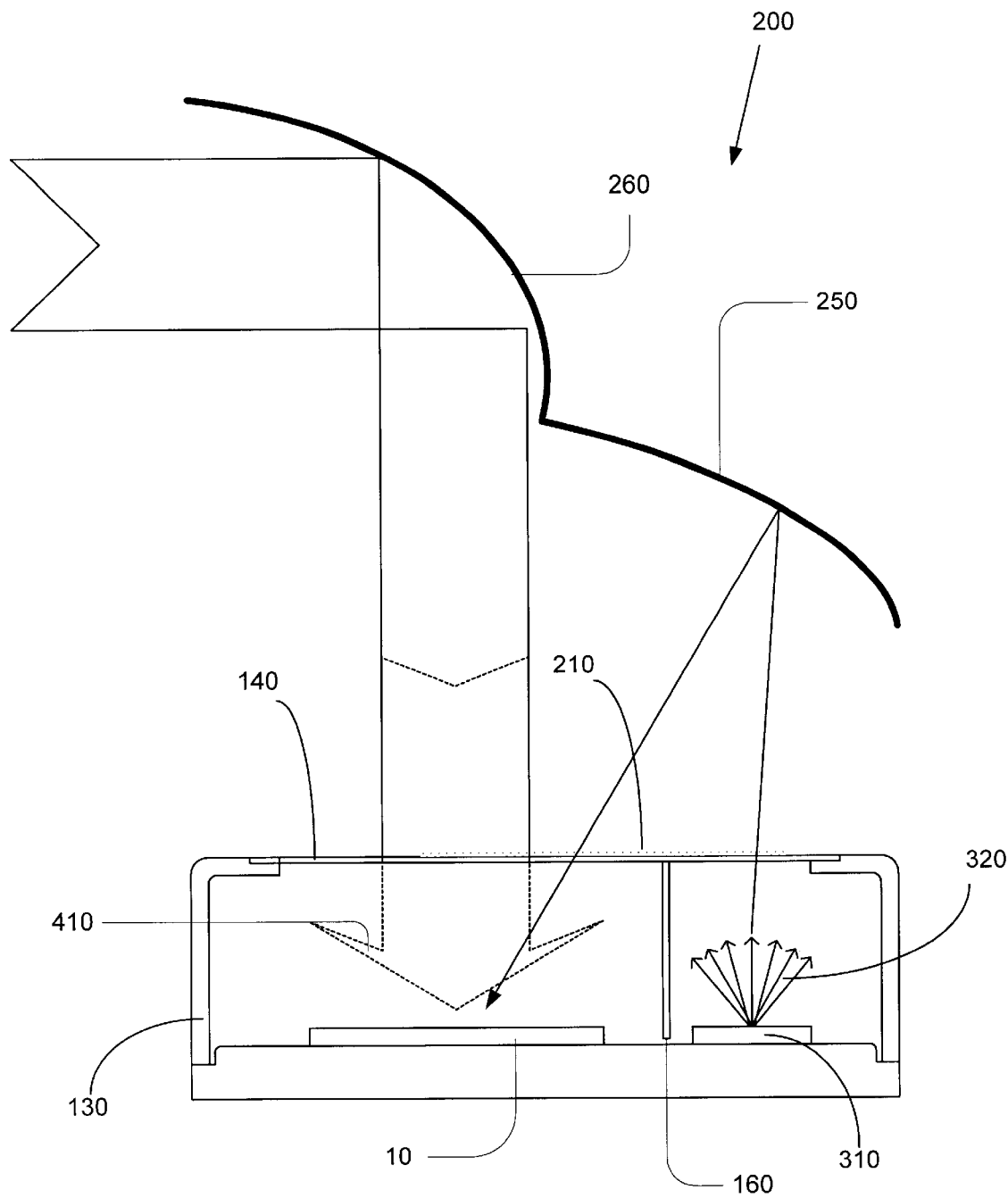
FIG. 4 a schematic diagram showing an arrangement of an IR sensing device including an IR radiator and an external mirror arrangement according to an embodiment of the present invention.

FIG. 4 is a schematic diagram showing an arrangement of an IR sensing device 200 including an IR radiator 310 and a mirror arrangement according to an embodiment of the present invention. As shown, there is mounted within the enclosure 130 an IR radiating device 310 which is electrically controlled to emit IR radiation 320. Preferably, IR radiating device 310 is thermally screened from IR sensor 10 by a screen 160 so as to avoid heat transfer from IR radiating device 310 by either conduction or direct radiation.

When an electrical signal is applied to IR radiating device 310, IR radiation 320 is emitted. Some of the radiated energy 320 falls on IR window 140. If window 140 is free of contaminant(s) 210, IR radiation 320 passes through window 140 and is reflected back from mirror 250 such as to pass through window 140 and fall onto IR sensor 10. It will be appreciated that the magnitude of the radiation reflected back from mirror 250 is dependent upon the power emitted by IR radiator 310 and the amount of contamination 210 on window 140 and on mirror 250. Mirror 250 is made of material selected for its ability to reflect IR radiation at a specific frequency or at a range of radiation frequencies as required for specific applications.

Figure 6A:
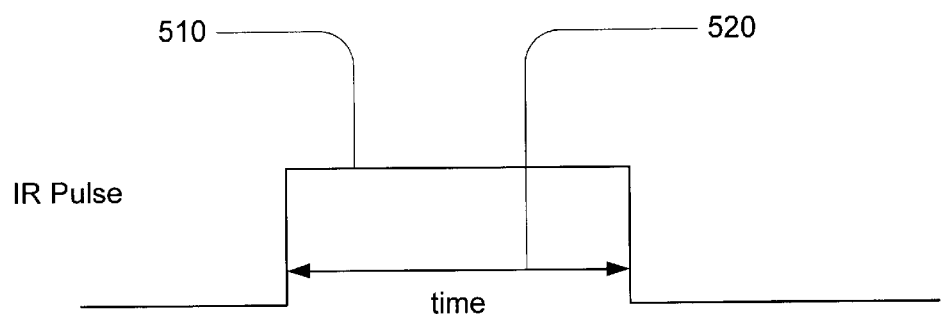
FIGS. 6a and 6b illustrate an example of an IR pulse and associated return signals, respectively according to an embodiment of the present invention.

FIGS. 6a illustrates an example of an IR pulse emitted by radiator 310 which results in an associated reflected signal (IR radiation reflected by mirror 250) according to the present invention. When an electrical pulse 510 is applied to IR radiator 310 for a time 520, the signal generated by temperature measuring unit 13 of IR sensor 10 rises and falls in response to the IR radiation reflected by mirror 250. If IR-opaque contaminants 210 are present on window 140, or on mirror 250, the reflected IR signal will have a reduced amplitude. The reduction in amplitude in the reflected signal relative to IR signal 320 will vary depending on the specific contaminant(s).

When window 140 is obscured wholly or partially by IR-opaque contaminant 210, some of reflected radiation is absorbed by contaminant 210. The temperature of contaminant 210 increases as a direct result of the absorption of this radiation, thereby causing a corresponding increase in the level of IR radiation 410 emitted by contaminant 210. This increase in IR radiation 410 is detected by IR sensor 10.

Figure 6B:
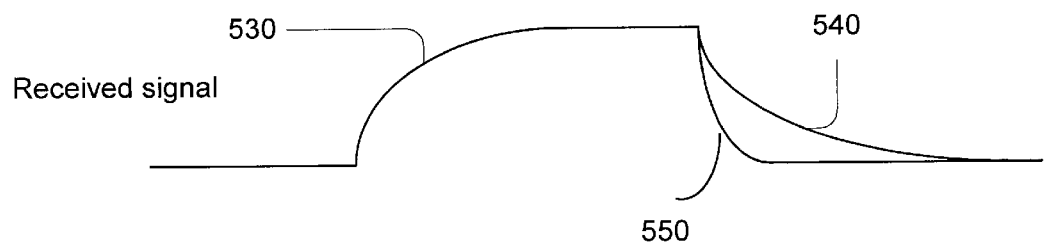

FIG. 6b illustrates an example of a return signal 530 (radiation emitted by contaminants on window 140) associated with the IR pulse of FIG. 6a. When a small amount of contaminant(s) is present, the return signal 530 will have a shorter decay time 550. When a larger amount of contaminant(s) is present, the return signal 530 will have a longer decay time 540. The return signal 530 is dependent upon the specific contaminant(s) and upon the heating effect of the contaminant(s) by the reflected IR radiation signal.

An electronic signal processor, coupled to sensor 10 and to IR radiator 310, is provided to control IR radiator 310 and to receive and analyze the electrical signals from temperature measurement unit 13. The processor determines the characteristics of contaminant(s) 210 and determines the gain necessary to compensate for the difference in window transmissibility and mirror reflectance. In a preferred embodiment, the processor includes a digital microprocessor and an analog-to-digital converter (ADC). In this embodiment, signals received from temperature measuring unit 13 are applied to the ADC, and the resulting digital signals are then processed by the microprocessor. The compensation and calibration constants are stored in a memory such as a digital non-volatile memory coupled to the processor.

It will be appreciated that additional signals can be generated by the signal processor to indicate the amount of contaminants 210 on window 140 or to signal that the magnitude of such contamination has exceeded a predetermined threshold and that the accuracy of the compensated signal may now be outside predetermined limits. It will be further appreciated that all or some of the components of the signal processor can be integrated into the same substrate 11 with IR sensor 10.

The addition of IR radiator 310 together with a means to control it allows the transmission efficiency of the window, and the reflectance efficiency of the mirror arrangement, to be determined and also to gain an indication of potential risks to the ongoing performance of the sensor installation. All such contraindications can be signaled to a controller (e.g., ECU or CPU) by means specific to the application.

In many typical applications, the temperature of a target source is measured by focussing, or directing, radiation from the target source onto the sensing element using one or more mirrors. An embodiment of such a mirror arrangement is also shown schematically in FIG. 4. It will be appreciated that the mirror 260 has similar characteristics to mirror 250 and can easily be constructed from the same materials and formed at the same time. Alternately, mirror 260 can be a separate component.

Figure 5:
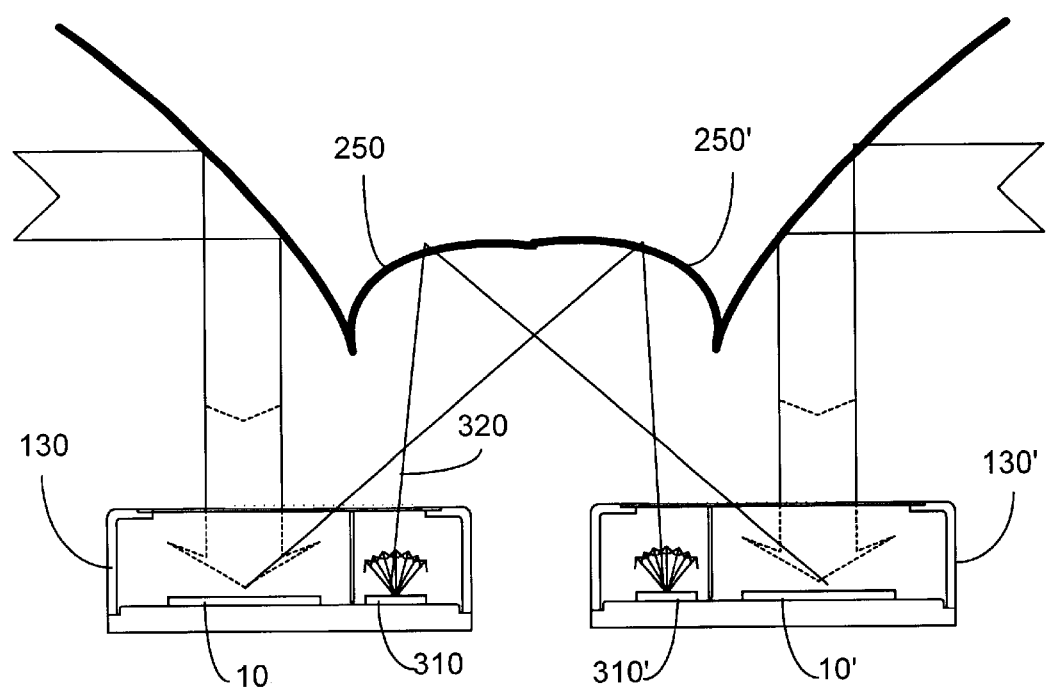
FIG. 5 is a schematic diagram showing an arrangement of two IR sensors according to an embodiment of the present invention.

The shape of mirror 250 is designed to reflect the radiation 320 from IR radiator 310 back onto IR sensing element 10. It will be appreciated that in a situation where more than one sensing device is installed in close and fixed proximity, the design of the mirror 250 can be more complex such as to reflect a first part of the IR radiation 320 back onto the sensing element 10 within housing 130 and a second part of the IR radiation 320 onto the sensing element 10' in a second housing 130', as shown in FIG. 5, for example. The IR radiation reflected onto IR sensor 10 in housing 130 will cause sensor 10 to generate a first electrical signal, and the IR radiation reflected onto the IR sensor 10' in the second housing 130' will cause sensor 10' to generate a second electrical signal. In a like manner, the IR radiator 310' and mirror 250' associated with the second sensing device can be arranged to reflect part of the IR radiation from the IR radiator 310' in the second housing 130' onto the IR sensor 10' in the second housing 130' and part onto the IR sensor 10 in housing 130. Mirrors 250 and 250' are preferably separate, but can be formed as one integral mirror as desired.

If the timings of the electrical pulses applied to the IR radiators 310 and 310' in the two housings are non-overlapping, then by comparison of the electrical signals generated by the IR sensors 10 and 10', the effects of contamination on that part of the window 140 used for transmission and that part used for reception of the main radiation 410 can be determined. Additionally, gain control values based on the attenuation of the main signal 410 can be computed.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, although pulsed IR radiation signals are discussed, one skilled in the art will realize that sinusoidal varying IR radiation signals can be used. Therefore, the scope of the appended claims should be accorded the broadest interpretation so as to encompass all such modifications and similar arrangements.

What is claimed is:

1. An Infra Red (IR) sensing device comprising:
   an IR sensor for detecting IR radiation, wherein the IR sensor generates electrical signals in response to and indicative of any IR radiation detected by the IR sensor;
   an IR opaque enclosure surrounding the IR sensor, the enclosure having an IR transparent window positioned to allow IR radiation from outside the enclosure to fall on the IR sensor;
   a mirror element, external to the enclosure, for reflecting IR radiation;
   an IR radiator located within the enclosure, wherein the IR radiator emits IR radiation, wherein at least a portion of a first IR radiation signal emitted by the IR radiator is reflected by the mirror element onto the IR sensor, wherein the reflected IR radiation signal is detected by the IR sensor, and wherein the IR sensor generates a first electric signal proportional to the detected IR radiation signal; and
   a processor coupled to the IR sensor for analyzing electric signals generated by the IR sensor, wherein the processor receives and analyzes the first electric signal to determine characteristics of the detected IR radiation signal.

2. The device of claim 1, wherein the reflected signal is reduced in amplitude proportional to an amount of IR-absorbing material on the window, wherein the IR sensor also detects a remote IR radiation signal generated by a remote target object, wherein the remote signal is attenuated by the IR-absorbing material on the window by a first amount, wherein the IR sensor generates a second signal proportional to the attenuated remote signal, and wherein the processor determines the gain needed to compensate for the first amount of attenuation caused by the IR absorbing material when analyzing the second electric signal.

3. The device of claim 1, wherein the IR sensor includes an IR absorbing portion coupled to a temperature measuring unit, wherein when the IR absorbing portion absorbs IR radiation its temperature increases by a proportional amount, and wherein the temperature measuring unit measures the temperature of the IR absorbing portion and generates the electrical signals, wherein the electrical signals are indicative of the temperature of the IR absorbing portion.

4. The device of claim 3, wherein the IR sensor further includes a heating element coupled to the IR absorbing portion, wherein the heating element is configured to raise the temperature of the IR absorbing portion by a controlled amount so as to assist in calibrating the IR sensor.

5. The device of claim 1, wherein the processor includes a means to control the IR radiator to emit the first IR radiation signal.

6. The device of claim 5, wherein the control means controls the IR radiator to emit the first IR radiation signal in the form of one or more pulses, wherein the reflected signal includes one or more reflected pulses, and wherein the processor analyzes the first electric signal to determine the magnitude of the reflected pulses.

7. The device of claim 5, wherein the processor includes a means for determining an amount of contamination obscuring the window by analyzing characteristics of the first electric signal.

8. The device of claim 7, wherein the processor further includes a means for modifying the characteristics of the electrical signals generated by the IR sensor in response to any IR radiation detected from a remote target object so as to compensate for the amount of contamination obscuring the window.

9. The device of claim 1, further comprising a screen located within the enclosure between the IR radiator and the IR sensor.

10. The device of claim 1, wherein the characteristics include the amplitude of the detected IR radiation signal.

11. The device of claim 10, wherein the processor includes a means for determining an amount of IR-absorbing material on the window using the amplitude of the reflected signal detected by the sensor.

12. The device of claim 1, further comprising a memory unit coupled to the processor, wherein the processor determines at least one calibration constant from the characteristics of the reflected signal detected by the sensor, and wherein the processor stores the at least one calibration constant to the memory unit.

13. The device of claim 1, further including a second mirror element, external the enclosure, for directing IR radiation emitted by a remote target object onto the IR sensor.

14. A method of measuring the temperature of a remote target object with an IR sensing device, wherein the IR sensing device includes an IR sensor mounted in a housing, the housing having a window through which IR radiation from a remote target object enters the device and impinges on the IR sensor, the method comprising the steps of:
   generating a first IR radiation signal with an IR radiator located within the housing;
   reflecting, with a mirror positioned external the housing, at least a portion of the first IR radiation signal, wherein if there is any IR-absorbing contamination on the window, the contamination absorbs at least a first portion of the reflected first IR radiation signal
   detecting the reflected IR radiation signal with the IR sensor;
   generating a first electric signal proportional to the detected signal;
   analyzing the first electric signal with a processor to determine the magnitude of the detected signal, wherein the magnitude of the detected signal is indicative of the amount of IR absorbing contamination on the window.

15. The method of claim 14, further comprising the steps of:
   detecting a remote IR radiation signal generated by the remote object, wherein the remote IR radiation signal is indicative of the temperature of the remote object, wherein the remote signal is attenuated by a first amount by the IR absorbing contamination on the window before being detected by the IR sensor; and
   compensating for the first amount of attenuation in the detected remote IR radiation signal so as to accurately determine the temperature of the remote object.

16. The method of claim 15, further comprising the steps of:
   determining a calibration constant with the processor, wherein the calibration constant is a function of the amount of IR absorbing contamination on the window; and
   storing the calibration constant to a memory unit.

17. The method of claim 16, wherein the step of compensating includes applying the calibration constant to the detected remote IR radiation signal.

18. The method of claim 14, wherein the first IR radiation signal is generated in the form of one or more pulses, wherein the reflected signal includes one or more pulses, wherein the detected signal includes one or more pulses having a reduced amplitude relative to the first IR radiation signal, and wherein the step of analyzing includes analyzing the first electric signal to determine the amplitude of the detected pulses.

19. An Infra Red (IR) sensing device comprising:
   an IR sensing means for detecting IR radiation, wherein the IR sensing means generates an electrical signal responsive to and indicative of the level of IR radiation falling on it;
   electronic interface means for processing the electrical signal, wherein the interface means generates a signal representative of the IR radiation detected by the IR sensing means;
   an IR opaque enclosure surrounding the IR sensing means and the electronic interface means, the enclosure including an IR transparent window arranged to allow IR radiation from a remote target object to fall on the IR sensing means;
   an IR radiating means, located within the enclosure, for emitting IR radiation;
   a first control means for controlling the IR radiation means to radiate IR energy;
   a mirror element, located external the housing, for reflecting IR radiation emitted by the IR radiating means onto the IR sensing means through the window, wherein the reflected IR radiation is attenuated by IR-absorbing contaminants on the window;
   a signal processing means for determining an amount of contamination on the IR transparent window by analyzing a first electrical signal generated by the IR sensing means in response to the reflected signal detected thereby; and
   a second control means for controlling the electronic interface means to compensate for the amount of contamination.

20. The device of claim 19, wherein the signal processing means generates signals indicating the level of IR opaque contamination on the IR transparent window.

21. The device of claim 19, further comprising a screen located within the enclosure between the IR radiating means and the IR sensing means.

22. The device of claim 19, further comprising a second mirror element, external the enclosure, for directing IR radiation emitted by a remote target object onto the IR sensing means.

23. The device of claim 19, wherein the signal processing means includes a microcontroller.

24. The device of claim 19, further comprising a memory coupled to the signal processing means, wherein the calibration and configuration for the signal processing means is stored in the memory.

25. The device of claim 19, wherein the IR sensing means includes a sensing element for absorbing IR radiation, the device further comprising a heating means for raising the temperature of the sensing element by a controlled amount to assist in calibrating the sensing element.

26. An Infra Red (IR) sensing device arrangement comprising:
   a first IR sensing device including:
      a first IR sensor for detecting IR radiation, wherein the first IR sensor generates first electrical signals in response to and indicative of any IR radiation detected by the first IR sensor;

a first IR opaque enclosure surrounding the first IR sensor, the first enclosure having a first IR transparent window positioned to allow IR radiation from outside the first enclosure to fall on the first IR sensor;

a first mirror element, external to the first enclosure, for reflecting IR radiation; and a first IR radiator located within the first enclosure, wherein the first IR radiator emits IR radiation;

a second IR sensing device located proximal the first IR sensing device, the second IR sensing device including:

a second IR sensor for detecting IR radiation, wherein the second IR sensor generates second electrical signals in response to and indicative of any IR radiation detected by the second IR sensor;

a second IR opaque enclosure surrounding the second IR sensor, the second enclosure having a second IR transparent window positioned to allow IR radiation from outside the second enclosure to fall on the second IR sensor;

a second mirror element, external to the second enclosure, for reflecting IR radiation; and a second IR radiator located within the second enclosure, wherein the second IR radiator emits IR radiation; and a processor coupled to the first and second IR sensors for analyzing electric signals generated by the first and second IR sensors, wherein at least a first portion of a first IR radiation signal emitted by the first IR radiator is reflected by the first mirror element onto the first IR sensor through the first window, wherein at least a second portion of the first IR radiation signal emitted by the first IR radiator is reflected by the second mirror element onto the second IR sensor through the second window, wherein at least a first portion of a second IR radiation signal emitted by the second IR radiator is reflected by the second mirror element onto the second IR sensor through the second window, and wherein at least a second portion of the second IR radiation signal emitted by the second IR radiator is reflected by the first mirror element onto the first IR sensor through the first window, wherein the first IR sensor generates a first electric signal proportional to the IR radiation detected thereby, wherein the second IR sensor generates a second electric signal proportional to the IR radiation detected thereby, and wherein the processor analyzes the first and second electric signals to determine characteristics of the IR radiation detected by the first and second sensors.

27. The arrangement of claim 26, wherein the first window has a first amount of contamination, wherein the second window has a second amount of contamination, and wherein the processor determines the first and second amounts of contamination using the characteristics determined from the first and second electric signals.

28. The arrangement of claim 26, wherein the first IR sensing device further includes a third mirror element, external to the first enclosure for directing radiation from a target source onto the first IR sensor, and wherein the second IR sensing device further includes a fourth mirror element, external to the second enclosure for directing radiation from the target source onto the second IR sensor.

29. An Infra Red (IR) sensing device arrangement comprising:

a first IR sensing device;

a second IR sensing device located proximal the first IR sensing device, wherein each IR sensing device includes:

an IR sensor for detecting IR radiation, wherein each IR sensor generates electrical signals in response to and indicative of any IR radiation detected by the IR sensor;

an IR opaque enclosure surrounding the IR sensor, each enclosure having an IR transparent window positioned to allow IR radiation from outside the enclosure to fall on the IR sensor; and an IR radiator located within the enclosure, wherein each IR radiator emits IR radiation;

a mirror element, external to the first and second enclosures, for reflecting IR radiation; and a processor coupled to the first and second IR sensors for analyzing electric signals generated by the first and second IR sensors, wherein at least a first portion of a first IR radiation signal emitted by the first IR radiator is reflected by the mirror element onto the first IR sensor through the first window, wherein at least a second portion of the first IR radiation signal emitted by the first IR radiator is reflected by the mirror element onto the second IR sensor through the second window, wherein at least a first portion of a second IR radiation signal emitted by the second IR radiator is reflected by the mirror element onto the second IR sensor through the second window, and wherein at least a second portion of the second IR radiation signal emitted by the second IR radiator is reflected by the mirror element onto the first IR sensor through the first window, wherein the first IR sensor generates a first electric signal proportional to the IR radiation detected thereby, wherein the second IR sensor generates a second electric signal proportional to the IR radiation detected thereby, and wherein the processor analyzes the first and second electric signals to determine characteristics of the IR radiation detected by the first and second sensors.

30. The arrangement of claim 29, wherein the first window has a first amount of contamination, wherein the second window has a second amount of contamination, and wherein the processor determines the first and second amounts of contamination using the characteristics determined from the first and second electric signals.

31. The arrangement of claim 29, wherein the first IR sensing device further includes a second mirror element, external to the first enclosure for directing radiation from a target source onto the first IR sensor, and wherein the second IR sensing device further includes a third mirror element, external to the second enclosure for directing radiation from the target source onto the second IR sensor.

* * * * *